Patented Nov. 17, 1931

1,832,386

UNITED STATES PATENT OFFICE

ALBERT HANAK, OF PHILADELPHIA, PENNSYLVANIA

PROCESS FOR SEPARATING TIN FROM ALLOYS

No Drawing.  Application filed October 22, 1930. Serial No. 490,535.

One object of the invention is to separate the tin from white metal alloys such as scrap type metals and bearing metals or from metals such as result from the smelting of white metal drosses, slags and other residues ordinarily met with in the non-ferrous secondary smelting industry. These metals are commonly called hard metals. Another object of the invention is to lower the tin content of such alloys to any desirable amount. The third object of the invention is to purify metals like lead or antimonial lead having small amounts of tin where this is objectionable. The process is applicable to alloys of tin, lead and antimony in any combination.

Heretofore, the common method of separating tin from alloys of tin, lead and antimony was by oxidation, tin having comparatively greater affinity for oxygen than lead or antimonial lead. Whether this oxidation was performed by air in the furnace or by oxidative ingredients such as niter in presence of caustic alkalis or alkaline earths in cast iron or steel kettles, the recovery of such oxidized tin is an involved and costly procedure resulting in substantial losses in metals as well as reagents. I have discovered that chlorine gas if conducted through a molten alloy of tin and lead, or lead, tin and antimony, will combine with the tin only, forming tin tetrachloride ($SnCl_4$) having a boiling point of 114° C. therefore vaporizing at a temperature at which the said alloys are melted and is recovered by condensation. There are certain catalytic agents which greatly assist in the reaction as well as prevent the chlorine to react with the lead. Metallic sulphides, such as small quantities of $Cu_2S$ or $NiS$ or both are especially beneficial but not essential to the process. I have also found that at no time will the antimony be attacked by the chlorine while tin or lead is present.

In carrying out the process, the metal is melted in a closed vessel having one or more inlets for the chlorine gas and an outlet for the $SnCl_4$ and is heated to a temperature of 350° to 500° C. The chlorine gas is then conducted in suitable pipes or tubes through the metal at such a rate that all chlorine is consumed, the temperature is kept below 600° C, and pure $SnCl_4$ issues from the outlet and is liquefied by a suitable condensing apparatus. $SnCl_4$ is a valuable chemical and can be disposed of as such or can be reduced to metallic tin and the chlorine content of it returned to the process.

As a specific example of my process, 10,000 pounds of an alloy consisting of 81% lead, 10% antimony and 9% tin, and 20 pounds of mixed copper nickel sulphide was treated as described with 1279 pounds of chlorine and obtained 2083 pounds of $SnCl_4$ containing .65% of free chlorine, also 375 pounds of lead chloride and 8821 pounds of antimonial lead containing no tin.

I claim:

1. The process of separating tin from white metal alloys which comprises in causing chlorine gas to pass through the molten alloy at an elevated temperature in presence of metallic sulphides to form stannic chloride.

2. The process of separating tin from white metal alloys which comprises in causing chlorine gas to pass through the molten alloy at an elevated temperature in the presence of a mixture of metallic sulphides.

3. The process of separating tin from white metal alloys which comprises in causing chlorine gas to pass through the molten alloy at an elevated temperature in presence of a mixture of copper and nickel sulphides.

ALBERT HANAK.